May 19, 1970  J. MOHR  3,512,877
OPTICAL MULTIPLE-REFLECTION SYSTEMS
Filed Nov. 17, 1967
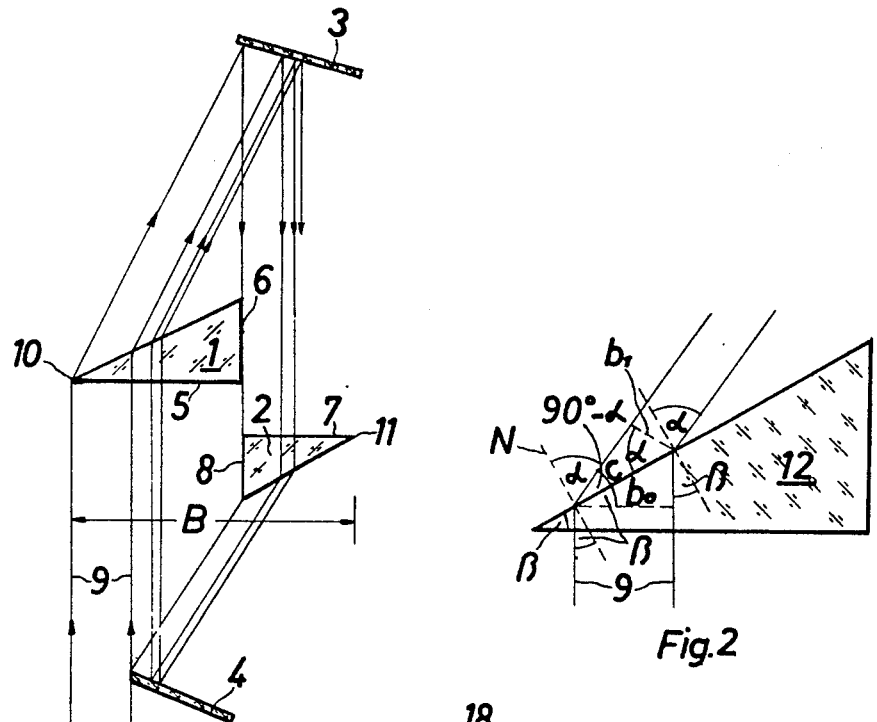
Fig. 1
Fig. 2
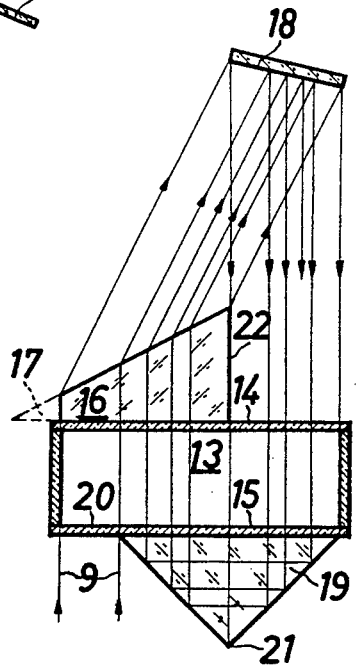
Fig. 3
Inventor
Joachim Mohr

United States Patent Office 3,512,877
Patented May 19, 1970

3,512,877
OPTICAL MULTIPLE-REFLECTION SYSTEMS
Joachim Mohr, Jena, Germany, assignor to VEB Carl
Zeiss Jena, Jena, Germany
Filed Nov. 17, 1967, Ser. No. 684,072
Int. Cl. G02b 5/04; G01n 1/10
U.S. Cl. 350—286         7 Claims

ABSTRACT OF THE DISCLOSURE

An optical system is used for the multiple reflection of an incident beam of parallel rays, the cross-sectional area of the beam being thereby reduced without injury to the parallelism of the rays. The optical system comprises a first and a second mirror and a first and a second interposed refracting prism. Said prisms are preferably right-angled, their refracting edges and cathete surfaces being parallel to each other. The light beam enters the system through said first prism, near the refracting edge of same. The mirrors are so inclined that the light bundle refracted by said first prism is reflected parallel to its direction of incidence. In lieu of one of said prisms and its conjugate mirror, a roof-prism may be used the ridge of which is parallel to the refracting edge of the other prism.

---

This invention relates to an optical system for multiple reflection between two plane mirrors of an incident beam of parallel rays, in which the cross-sectional area of the beam is reduced without injury to the parallelism of the rays. Optical systems of this kind are preferably used to irradiate optically transparent homogeneous substances for producing scattered radiation and fluorescence.

A known specimen cell for spectrometers is bounded by a plane mirror-coated bottom and a plane mirror-coated upper surface which enclose an acute angle, so that the light for irradiation is reflected up and down several times. As the distance apart of the upper surface and the bottom diminishes towards the side remote from the light incidence, the angles enclosed by the normals of the respective mirror faces and the incident or reflected light beam decrease continuously until, at definite places, the light beam is at right angles to both these faces and, in the course of further reflection, reverses and leaves the cell partially unused.

In other known optical systems, an imaging effect is produced by the mirror themselves, or imaging systems are located between the mirrors. Not only are the optical elements of such systems rather intricate and difficult to adjust, but the demands on constancy of adjustment are most exacting, so that even slight errors in manufacture and setting will rule out the possibility of an infinity of reflections, even if all other requirements are duly met.

The present invention aims at providing an optical system in which a beam of parallel rays can be reflected an infinity of times without the necessity of optical imaging elements, and which is easier to manufacture and more reliable in operation than the known systems of the kind.

To this end the invention consists in an optical system for multiple reflection of an incident beam of parallel light rays between a first and a second plane mirror, characterized by two refracting glass prisms which are located between the mirrors and whose refracting edges remote from each other are parallel, the one of the prisms being traversed by the beam only at the moment of incidence and immediately after reflection by the second mirror, and the other of the prisms being traversed by the beam only immediately after reflection by the first mirror. The refracting prisms are far easier to manufacture and adjust than are the aspherical optical elements used herebefore. The rays of the beam between the prisms are precisely parallel to each other, and the dimension of the cross-sectional area of the beam is reduced after each passage of the rays through a prism.

To ensure that every part of the space between the prisms is traversed by the beam of parallel rays, it is advisable to provide that those cathete (or the short sides of a rectangular triangle) surfaces of the refracting prisms which are not struck by the rays are in alignment with each other in a plane. The ray path is particularly advantageous if the prisms are rectangular and, moreover, if their cathete surfaces struck by the incident beam are at right angles to this beam. It is furthermore advisable, for example for purposes of adjustment, to provide that the mirrors are displaceable parallel to the incident beam. For changing the distance apart of the refracting prisms, at least one of these prisms and its conjugate mirror may be displaceable parallel to the incident beam.

An optical multiple-reflection system of particularly simple adjustment and low losses of light intensity can be obtained by replacing one of the refracting prisms and its conjugate mirror by a reflector for 180° reflection, for example a rectangular prism or a respective square.

The prisms and mirrors coordinated to the parallel light-entrance and light-exit surfaces of the primary radiation may be independent elements or may be parts of a specimen cell for scattered-light measurement. A system of the latter kind simplifies the production of a path of parallel rays in the cell and eliminates disturbances, for example in measurements of the depolarization factor in Raman spectroscopy.

In order that the invention may be more readily understood, reference is made to the accompanying drawings which illustrate diagrammatically and by way of example two embodiments of an optical multiple-reflection system, and in which:

FIG. 1 shows the optical parts of one embodiment, projected in a plane,

FIG. 2 illustrates the optical and mathematical conditions of the passage of a beam of parallel rays through a refracting prism, and FIG. 3 shows another embodiment, which has a specimen cell for scattered-light measurement.

In FIG. 1 of the drawings, two rectangular refracting prisms 1 and 2 are located between two plane mirrors 3 and 4. The cathete surfaces of the prism 1 are designated 5 and 6, and those of the prism 2 are designated 7 and 8. The larger cathete surfaces 5 and 7 of the two prisms are parallel to each other, while the smaller surfaces 6 and 8 are in alignment with each other in a plane which is at right angles to that of the drawing and parallel to an incident beam 9.

The beam 9 of parallel rays strikes the cathete surface 5 of the prism 1 at right angles in the vicinity of the refracting edge 10, which lies in a plane normal to that of the drawing. The prism 1 refracts the beam 9 to the mirror 3, which reflects it parallel to the direction of incidence and makes it strike at right angles, in the vicinity of the smaller cathete surface 8, the larger cathete surface 7 of the prism 2. The prism 2 refracts the beam 9 away from the edge 11, which is parallel to the refracting edge 10, and directs it to the mirror 4. The mirror 4 reflects the beam 9 parallel to the direction of and quite near its original incidence and thus terminates one cycle of the beam in the optical system. A new cycle begins at the moment at which the light bundle reflected by the mirror 4 strikes the cathete surface 5 of the prism 1.

The refractions by the prisms 1 and 2 reduce the beam 9 in its cross-sectional area, which is parallel to the plane of the drawing. This reduction takes place twice in each cycle, and each cycle brings the beam 9 of parallel rays nearer to the smaller cathete surface 6 of the prism 1, and removes it from the smaller cathete surface 8 of the prism 2, by an amount equal to the beam diameter in the plane of the drawing. The reduction of the cross-sectional area of the beam 9 and, accordingly, the magnitude of the approach to, and withdrawal from, the respective smaller cathete surface are functions of the prism angles at the refracting edges 10 and 11 and the indices of refraction of the two prisms. These indices may be equal to each other.

The diagram in FIG. 2 elucidates the relations of the refraction and the contraction of the beam 9 with reference to a prism 12 having a refractive index $n$, a refraction angle $\beta$ and an angle of refraction $\alpha$. The beam 9, of a breadth $b_0$, traverses the larger cathete surface of the prism 12 and leaves this prism through part of its hypotenuse surface, the breadth of this part in the plane of the drawing being $c$. The magnitude of the refraction by the prism 12 in relation to the normal N to the hypotenuse surface follows from the equation $\sin \alpha = n \cdot \sin \beta$. Subsequently to this refraction, the beam 9 has a breadth $b_1$, which is calculated as follows:

$$b_1 = c\sqrt{1-n^2 \sin^2 \beta} = \frac{b_0}{\cos \beta}\sqrt{1-n^2 \sin^2 \beta}$$

the concentration of the beam 9 after each passage through a refracting prism resulting from $b_0$, $n$ and $\beta$. The only purpose of the mirrors is to make the rays of the refracted beam 9 parallel to the direction of incidence.

The above formulas make it easy to estimate the breadth B (FIG. 1) of the optical system, since $$b_{v+1} = b_v \sqrt{\frac{1-n^2 \sin^2 \beta}{\cos \beta}}$$

wherein $v$ is a positive whole number.

A substitution of $a$ for $$\sqrt{\frac{1-n^2 \sin^2 \beta}{\cos \beta}}$$

and the consideration that $$b_v = b_0 \left(\sqrt{\frac{1-n^2 \sin^2 \beta}{\cos \beta}}\right)^v = b_0 \, a^v$$

permits the deduction of the following equation from the breadth B of the system and a number $u$ of possible reflections:

$$B = b_0 + b_1 + b_2 = \sum_{v=0}^{u} b_0 \, a^v = b_0 \frac{a^u - 1}{a - 1}$$

Since $a$ is always smaller than 1, the sum of the developed geometrical progression for $u \to \infty$ is always smaller than $$\left|\frac{b_0}{a-1}\right|$$

If the prism angle $\beta$ is 30° and if the refractive index $n$ is 1.5, the magnitude of $a$, for example, will be 0.764. Accordingly, a breadth B of the optical system is approximately 21.2 millimetres.

In FIG. 3, a specimen cell 13 has parallel walls 14 and 15. The wall 14 carries a refractive prism 16, the apex 17 of which is cut off. A plane mirror 18 displaceable parallel to the direction of incidence of the beam 9 is so coordinated to the prism 16 as to lie opposite the part of the wall 14 left uncovered by the prism 16. A rectangular prism 19 is so placed on the wall 15 as to cover this wall with the exception of a window 20 opposite the narrow end of the prism 16, this window receiving the incident bundle 9 of parallel rays. The ridge 21 of the prism 19 and the cathete surface 22 of the prism 16 lie in a plane at right angles to that of the drawing.

The beam 9 at right angles to the wall 15 traverses the window 20 and a marginal part of the specimen cell 13 and is refracted by the prism 16 to the mirror 18, which reflects it to strike the wall 14 at right angles. The beam 9 now traverses a medial part of the cell 13, is deviated 180° by the prism 19, again traverses a medial part of the cell 13, traverses the prism 16 in the vicinity of the cathete surface 22 and, subsequently to reflection by the mirror 18, traverses that marginal part of the cell 13 which is opposite the marginal part at which it incided.

A further study of the refractions and reflections of the beam 9 will reveal that an odd number of refractions causes the beam 9 to be directed through the medial part of the cell 13, and that an even number of reflections causes the beam 9 to be directed through the marginal parts of the cell 13. As in the optical system of FIG. 1, where a limit cycle is reached only after an infinite number of reflections of the beam 9, this limit cycle passing through the cathete surface 6 of the prism 1 and the refracting edge 11 of the prism 2, so it is in the optical system of FIG. 3, where there is a limit cycle for the path of the beam 9, which in the cell 13 is symmetric to the plane containing the cathete surface 22 of the prism 16 and the ridge 21 of the prism 19. When at the abovementioned limit positions, the beam 9 has no dimension in width (parallel to the plane of the drawing) any more.

The embodiments of the invention particularly described are represented merely as examples of how the invention may be applied. It is possible without departing from the spirit of the invention to interchange parts of the one embodiment with parts of the other or to change the positions of such parts.

I claim:

1. An optical system for multiple reflection between two plane mirrors of an incident beam of parallel rays, in which the beam on its path between the mirrors is reduced in cross-sectional area without losing its parallelism, comprising a first and a second plane mirror, and a first and a second refracting prism, the refracting edges of said two prisms being parallel to each other and lying at those ends of the prisms which are remote from each other, said first prism being conjugated to and in the path of parallel rays located in front of said first mirror and being traversed by the rays only at their incidence and directly after their reflection by said second mirror, said second prism being conjugated to and in the path of parallel rays located in front of said second mirror and being traversed by the rays only directly after their reflection by said first mirror, each of said prisms being for the refraction of said parallel rays to the mirror succeeding it, and each of said mirrors being adapted to impart to the rays refracted by the preceding prism a direction parallel to their direction of incidence.

2. An optical system as claimed in claim 1, wherein the prism surfaces not traversed by the beam lie in one plane.

3. An optical system as claimed in claim 2, wherein the prisms are rectangular.

4. An optical system as claimed in claim 3, wherein the prism entrance surfaces struck by the incident beam are at right angles to this beam.

5. An optical system as claimed in claim 4, wherein one of the prisms and the mirror succeeding it in the ray path are replaced by an angle prism for 180° reflection.

6. An optical system as claimed in claim 5, wherein at least one prism and the mirror succeeding it in the ray path are displaceable parallel to the direction of incidence of the ray path.

7. An optical system as claimed in claim 6, wherein a specimen cell is disposed between the prisms.

References Cited

UNITED STATES PATENTS

| | | | |
|---|---|---|---|
| 584,976 | 6/1897 | Abbe | 350—286 X |
| 1,848,874 | 3/1932 | Fitzgerald | 356—201 |
| 2,206,521 | 7/1940 | Akker et al. | 356—100 |
| 2,779,230 | 1/1957 | White | 350—202 X |
| 3,174,044 | 3/1965 | Tien | 332—7.51 |

DAVID SCHONBERG, Primary Examiner

P. A. SACHER, Assistant Examiner

U.S. Cl. X.R.

356—246